Patented Aug. 13, 1935

2,010,805

UNITED STATES PATENT OFFICE 2,010,805

PROCESS FOR THE PRODUCTION OF METAL COATINGS ON CELLULOID SUBSTITUTES

Max Ow-Eschingen, Vienna, Austria

No Drawing. Application November 22, 1932, Serial No. 643,949. In Austria December 3, 1928

3 Claims. (Cl. 91—68.3)

The present application forms a continuation in part of my copending application Serial Number 411,398 filed December 3, 1929 for Process of metallizing.

It is already known to firmly apply good conducting metal coats to ebonite and other rubber articles in an easy and perfect manner, without causing any change in the shape of the finished article by a coating, etching and the like or without adding to the mass during the shaping of the article to be metallized substances which at a later stage render possible a metallization for instance by a reducing process.

It has been found that the principle applied in the case of rubber articles can be readily applied in the case of a large number of articles if suitable solvents (swelling agents) and reducing agents are employed.

Of course the same solvents (swelling agents) cannot be applied as in the case of rubber articles. Also the reducing agents which are suitable for use with rubber articles are not necessarily applicable for every other non-metallic material because a suitable reducing agent must be chosen for each material to be metallized.

However, in all cases care has to be taken, that the mass of the articles to be metallized is slowly swelling in the solvent of the reducing agent and the reducing agent is sufficiently soluble in the said solvent, but does not obstruct the swelling operation of the article to be metallized and that, after dipping the article into the reducing solution and subsequently drying the same, the original shape of the said article is not changed in any way and the article retains the reducing agent. The reducing agent may consist of hydroquinone or be selected from the benzol and naphthalene series.

It has been found that in case of a satisfactory proportion between the solvent and the reducing agent, the metal precipitates very quickly condense also to such a thick layer on the material of the article, that it is not necessary to subsequently increase the effect by galvanic treatment. By simple rubbing of the metallized article, a high polish can be imparted to the same.

In case it is not desired to metallize the whole article, the places which are not to be covered with metal are covered with a coating, which does not obstruct the process of metallization, but is metallized and thus protects the part of the article below the same and can be readily removed with the non-required metal coating after the completion of the metallization with the result of sharp boundaries. Care has to be taken that the proper coating and solvent as well as the reducing agent are chosen for the material to be metallized. For instance a cellulose ester varnish and in certain cases also an asphalt varnish can be used.

The following materials are well adapted for metallizing the articles formed therefrom: Casein, albumin, urea, sulphourea, formaline products of condensation, phenol-formaline products of condensation, artificial resin, products of glue and gelatine, and various mixed products of colloidally swelling members.

*Example.*—A polished article of a casein product of condensation for instance a galalith-article is deprived of fatty substances, immersed in 3 to 4% aqueous solution of hydroquinone, thoroughly dried and then placed into a reducible solution of a metallic salt (for instance, silver). Firmly adhering metal is precipitated immediately. The article is perfectly metallized after repeating the process three times. The metal becomes highly polished after being rubbed.

If the whole article is not to be metallized (silvered) those parts which are to remain free from metal are coated for instance with an acetyl cellulose varnish. The coat of varnish is thoroughly metallized but can be readily removed by immersing the article with the metal coating in water.

When metallizing casein condensation products water is used as solvent (swelling agent) and hydro-quinone, p-aminophenol, or p-phenylene-diamine as reducing agent. In the case of albuminous products water is again used as swelling agent, while as reducing agent a reducing aromatic compound containing amino-groups, e. g. p-amino-phenol or p-phenylene-diamine, is employed. Phenol condensation products require acetone as swelling agent and a mixture of hydroquinone and catechol or pyrogallol as reducing agent. Aqueous solutions of hydroquinone are suitable for urea and thiourea products, but it is necessary to employ them practically in the boiling state. Solutions of a mixture of hydroquinone and methyl p-amido-phenol in diluted alcohol (one part alcohol and one part water) are used as reducing agent for products produced by the aid of glue or gelatine. In the case of the metallization of mixed products at least one component, preferably the principal constituent of the material, must be known and adapted to be attacked by the corresponding swelling and reducing agents.

The non-metallic materials which may be metallized by this invention are too numerous to set forth here. However, all the materials must be at least partly capable of swelling, and in the swollen condition they must be capable of absorbing a reducing agent from its solution in a solvent which causes them to swell, and to retain said agent after drying. Reducing agents other than those hereinbefore specifically mentioned may also be used.

*Example.*—A polished phenol-condensation product for instance a phenol artificial resin is freed of any fatty substance, immersed for about 3 to 5 minutes in a solution of 4 parts hydroquinone and 1 part pyrocatechine in 100 parts acetone, well dried and thereupon placed for about 2 minutes in a reducible solution of a metallic salt for instance a 2% solution of silver nitrate heated to about 80° C. Firmly adhering metal is immediately separated out. Repeated immersion may be necessary in some cases to produce complete metallization.

In the case of urea products of condensation, the article is immersed for about 2 minutes in an aqueous 4 to 5% solution of hydroquinone heated to about 90° C. Thereupon the article is dried and hereafter immersed for 1 to 2 minutes for instance in a 2% solution of silver nitrate of a temperature of 80 to 90° C. In most cases a repeated immersion is not necessary.

What is claimed is:

1. Process for the production of firmly adhering dense metal coatings on finished articles without changing their shape during metallization; said articles being made of materials, which are produced on a colloidal basis and selected from a group consisting of casein, albumin, glue and gelatine products, said process consisting in introducing into said articles a swelling agent containing an aromatic amine reducing agent dissolved therein which does not obstruct the action of swelling, then drying the articles, whereupon, the reducing agent remains firmly adherent to the surface of the articles, and finally immersing the articles in a reducible metallic salt bath to precipitate upon the articles, metal which firmly adheres to the articles.

2. Process for production of firmly adhering, dense metal coatings on finished articles without changing their shape during metallization, said articles being made of materials which are produced from glue or gelatine; said process consisting in introducing into said articles a reducing agent dissolved in an aqueous solvent therefor which also acts as a swelling agent and thereby causing the absorption of the reducing agent by the articles and finally immersing the articles in a reducible metallic salt bath, thereby precipitating the metal.

3. Process for production of firmly adhering, dense metal coatings on finished articles without changing their shape during metallization, said articles being made of materials which are produced from glue or gelatine; said process consisting in introducing into said articles a mixture of hydroquinone and methyl p-amido-phenol as reducing agent dissolved in alcohol and water thereby causing the absorption of the reducing agent by the articles and finally immersing the articles in a reducible metallic salt bath, thereby precipitating the metal.

MAX OW-ESCHINGEN.